United States Patent [19]

Grütter et al.

[11] 3,941,211
[45] Mar. 2, 1976

[54] APPARATUS FOR CONTROLLING LUBRICATION OF COMPRESSED AIR TOOLS

[76] Inventors: Walter Grütter, Gartenstrasse 118, CH 4052 Basel, Switzerland; Gerhard Kapper, Neckarstrasse 32, D 7301 Zell (Neckar), Germany

[22] Filed: Jan. 3, 1975

[21] Appl. No.: 538,334

[30] Foreign Application Priority Data
Jan. 8, 1974 Germany............................ 2400758

[52] U.S. Cl............... 184/56 A; 137/205.5; 222/193
[51] Int. Cl.²....................................... F16N 7/34
[58] Field of Search.... 184/55 A, 55 R, 56 R, 56 A, 184/57, 58, 59; 128/194; 222/193; 137/205.5; 261/71, DIG. 65

[56] References Cited
UNITED STATES PATENTS

| | | | |
|---|---|---|---|
| 571,350 | 11/1896 | Fayette | 137/205.5 |
| 1,079,721 | 11/1913 | Pungs | 137/205.5 |
| 1,455,069 | 5/1923 | Bluemel | 184/55 A X |
| 1,721,231 | 7/1929 | Osborne | 184/55 A |
| 2,225,324 | 12/1940 | Slater | 184/55 A |
| 2,887,181 | 5/1959 | Dillon | 184/55 A |
| 2,982,376 | 5/1961 | Lincoln | 184/55 A |
| 3,057,433 | 10/1962 | Rusche | 184/55 A X |
| 3,243,014 | 3/1966 | Bjorklund | 184/55 A |
| 3,666,245 | 5/1972 | Edwardson | 137/205.5 |
| 3,720,290 | 3/1973 | Lansky | 184/55 A |
| 3,807,434 | 4/1974 | Rasmussen | 137/205.5 |

FOREIGN PATENTS OR APPLICATIONS
624,260 7/1961 Canada........................... 137/205.5
452,074 8/1936 United Kingdom............... 184/55 A Primary Examiner—Richard J. Apley
Assistant Examiner—Arnold W. Kramer
Attorney, Agent, or Firm—Roylance, Abrams, Berdo & Kaul

[57] ABSTRACT

Apparatus for controlling lubrication of compressed air tools includes a supply container of lubricating liquid and an air flow pipe extending through the container for connection with a source of compressed air. A control device having both liquid and air flow control valves therein is mounted adjacent to the container and a flow throttler in the form of an aperture or venturi disposed in the air flow pipe. Upstream of the flow throttler, a flow line diverts a portion of the air flow through the control device, past the air flow control valve therein, and then back into the container to apply a pressure against the liquid therein. A liquid supply pipe extends from the liquid in the container to the control device and as the air pressure is applied against the liquid, such pressure causes the liquid to flow through the supply pipe and into the control device, past a liquid flow control valve therein, and then back through a flow line which connects to the air flow pipe downstream of the flow throttler. The liquid passing through the downstream flow line thus mixes with the air passing through the throttler of the air flow pipe. Both the air flow control valve and the liquid flow control valve are manually adjustable.

8 Claims, 8 Drawing Figures

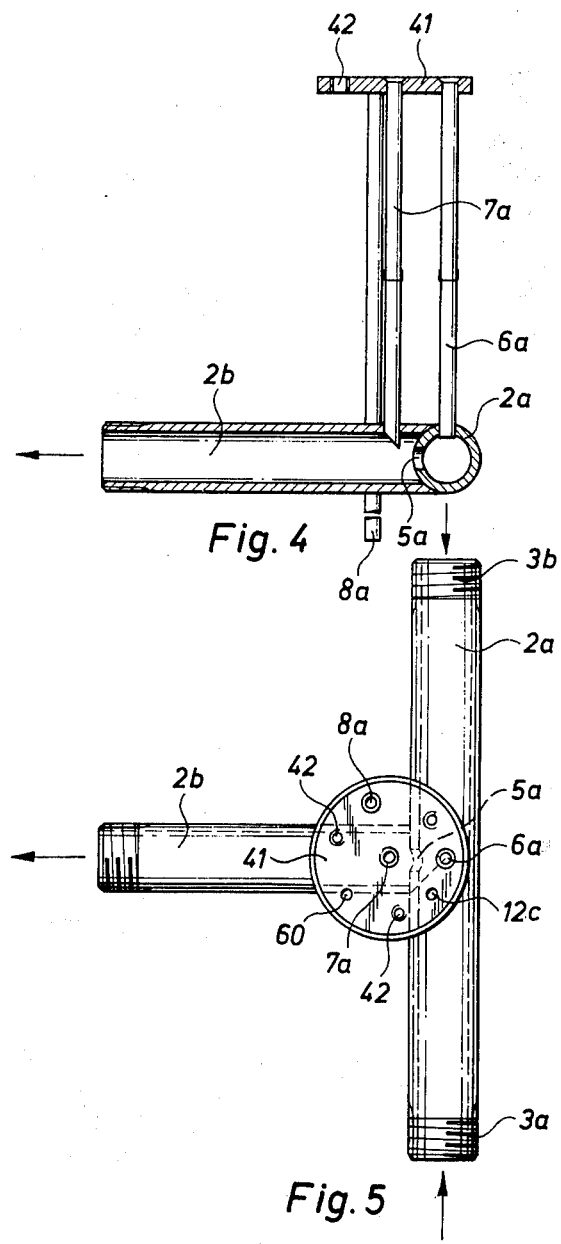

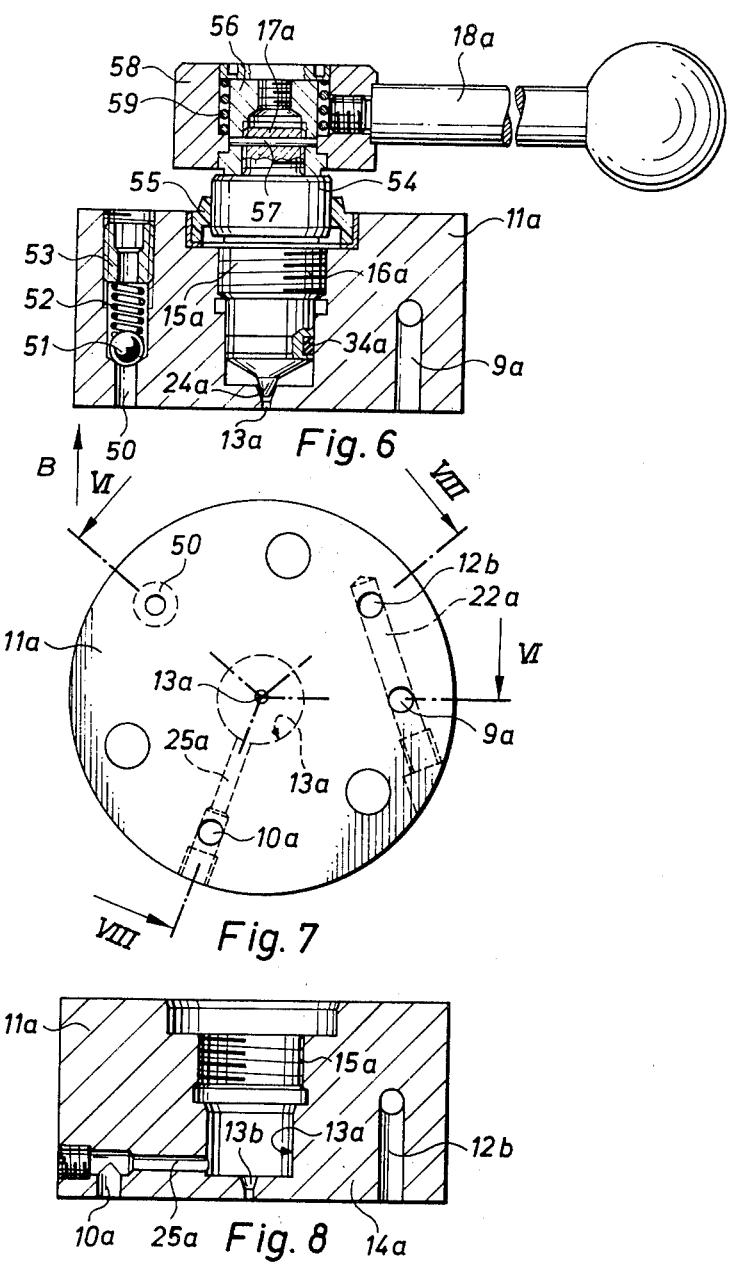

APPARATUS FOR CONTROLLING LUBRICATION OF COMPRESSED AIR TOOLS

This invention relates to apparatus for controlling lubrication of compressed air tools, and in particular, for providing an arrangement where lubricating liquid, such as lubricating oil, is admixed with a stream of compressed air which is being supplied to a tool which is operated by such compressed air.

There are certain known forms of tools and equipment which are operated by compressed air, such as, for example, pneumatic hammers of heavy duty construction. Because tools of this type contain movable parts which are often reciprocated at a rapid rate, it is necessary that such tools be suitably lubricated during their operation. One advantageous way for accomplishing such lubrication is by mixing the lubricant into the stream of compressed air which is supplied to the tool.

While certain forms of lubricating apparatus for such compressed air tools have been heretofore known, such prior forms have not proved altogether satisfactory in use. In some of the known forms, the flow rate or flow quantity of the lubricating liquid could not be easily adjusted. In some instances, this was due to the very nature of the adjustment valves, but in other instances, the valves were either damaged or tended to become corroded or clogged after use. In such event, the proper quantity of lubricating liquid was not supplied to the tool thus raising the possibility of damage to the tool itself. Also, in the case of some known forms of lubricating apparatus where a separate lubricating liquid line was provided, such line could become damaged as the compressed air tool was used, and if line damage occurred, the liquid could flow out.

The object of the present invention is to overcome the drawbacks and deficiencies associated with known forms of lubricating apparatus and to provide a new and improved type of apparatus wherein the flow of lubricating liquid to the compressed air tool can be easily and accurately and rapidly adjusted.

Another object of the present invention is to provide apparatus for attachment with a compressed air tool for lubricating such tool wherein the quantity of lubricating liquid can be variably adjusted within rather wide limits.

Another object of the present invention is to provide a compact, safe and easily operable unit for admixing lubricating liquid with compressed air flowing to a compressed air tool, which unit is relatively simple in construction yet is capable of extended periods of operation without failure and without undue maintenance requirements.

Further objects, advantages and salient features of the invention will become apparent from the following detailed description, the claims and the drawings, which show two embodiments of apparatus in accordance with the principles of the present invention.

In general, the apparatus of the present invention includes an air flow line which extends through and is hermetically sealed within a supply container which carries the lubricating liquid for the compressed air tool, for instance, lubricating oil. The air flow pipe is connected with the source of compressed air for the tool which can advantageously be an air compressor. A control device is attached to the lubricating liquid supply container and this control device includes a liquid flow control valve means and an air flow control valve means, both of which can be quickly and easily manually adjusted by the operator. A throttling means is provided within the air flow pipe and the air flow can thus be considered as being either upstream or downstream of the throttling means. In one embodiment, the throttling means takes the form of a venturi or restricted throat while in the other embodiment the throttling means takes the form of a restricted opening from a main line into a branch line.

An upstream flow line connects from the upstream side of the air flow pipe to the control device. Within the control device, internal ducts assure that the air flow from the upstream flow line will pass through the air flow control valve and then to an outlet opening which discharges back into the supply container. As a result, air flow through the upstream flow line is discharged at a controlled rate back into the supply container to exert a pressure on the surface of the lubricating liquid therein.

The apparatus of the present invention also includes a downstream flow line connected between the downstream side of the air flow pipe and the control device. It also includes a liquid supply pipe or eduction tube which extends from the control device into the supply container and below the level of the liquid therein. Internal flow ducts in the control device connect the downstream flow line and the liquid supply line, such connection being accomplished through the liquid flow control valve.

The application of the air pressure against the surface of the lubricating liquid causes such liquid to rise through the liquid supply line and to flow past the liquid flow control valve, through the downsteam flow line and back into the air flow pipe on the downstream side of the throttling means. At this point, the liquid is admixed with the compressed air flowing through the pipe and is then conveyed to the tool which is operated by the compressed air.

Referring now to the drawings which illustrate the present invention:

FIG. 4 is a simplified sectional view taken along the line IV—IV of FIG. 2, with certain parts not being shown for ease of illustration;

FIG. 5 is a top plan view of the apparatus shown in FIG. 4;

FIG. 6 is a sectional view through the control head or control device of the second embodiment, taken along the line VI—VI of FIG. 7;

FIG. 7 is a bottom plan view of the control device looking in the direction of the arrow B in FIG. 6; and FIG. 8 is a sectional view taken along the line VIII—VIII of FIG. 7, with certain parts not being shown for ease of illustration.

Figure 1:
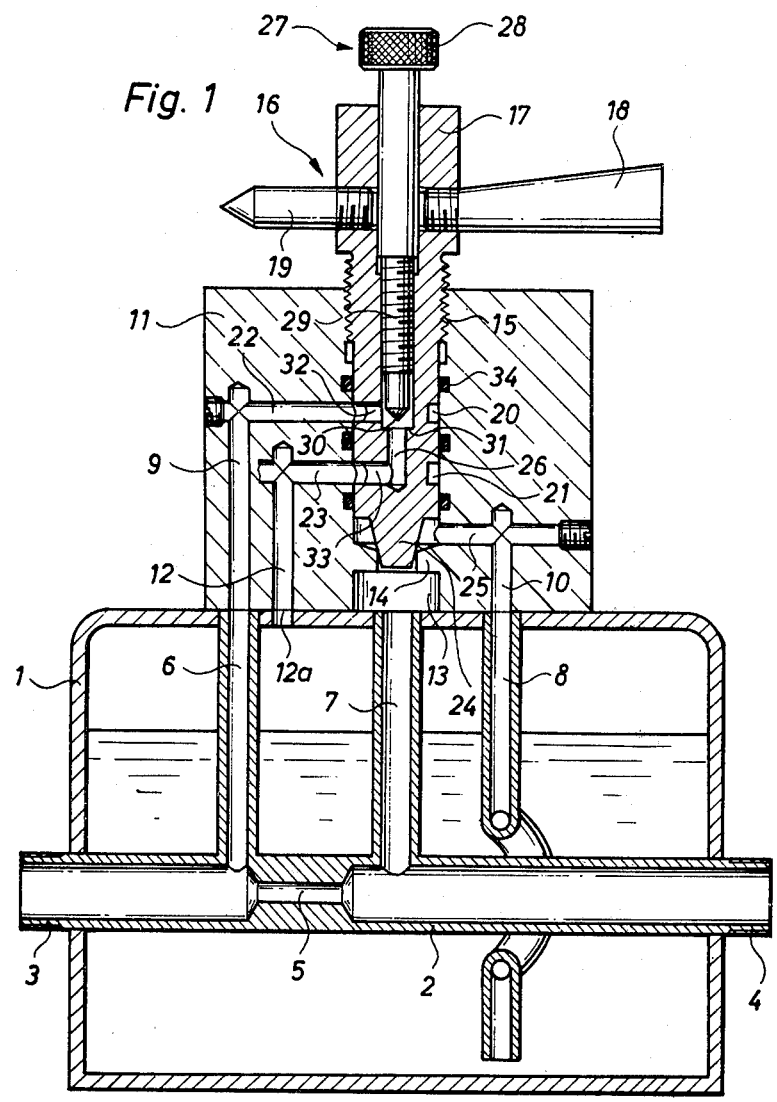
FIG. 1 is a longitudinal sectional view through a first embodiment of apparatus in accordance with the present invention.

Referring now to the first embodiment as illustrated in FIG. 1, it will be seen that a closed pressure proof container 1 is provided and that within such container, there is a supply of lubricating liquid which can advantageously be lubricating oil. The level of this lubricating liquid is shown somewhat beneath the top of the container 1. An air flow pipe 2 extends through the container 1 and is hermetically sealed to prevent the lubricating liquid which surrounds the pipe from either entering thereinto or from flowing out at those portions where the pipe 2 projects through the walls of the container. Connecting sleeves 3 and 4 are mounted at opposite ends of the pipe 2 to enable the pipe and hence the apparatus to be connected with a source of compressed air and with the tool, for example, a pneumatic hammer, which is to be operated by the compressed air.

A throttling means 5 is provided within the air pipe 2, such throttling means being in the form of a venturi or restricted flow throat through which the compressed air passes. If the sleeve 3 is used to connect the apparatus to a supply of compressed air and the sleeve 4 is used to connect the pipe 2 to the tool which is operated by the compressed air, then that portion in advance of the throttling means 5 can be considered as the upstream side of the air pipe 2 and that portion following the throttling means 5 can be considered as the downstream side.

A pipe or flow line 6 extends between the upstream side of the pipe 2, just in advance of the throttling means, and the top of the container 1. Similarly, a pipe or flow line 7 extends between the downstream side of the pipe 2 and the top of the container 1. The pipe 6 can thus be considered as the upstream pipe while the pipe 7 can be considered as the downstream pipe. A liquid supply pipe or eduction tube 8 is also provided in the container 1, with the supply pipe 8 extending from the top of the container and having an open end beneath the level of the lubricating liquid therein, near the bottom of the container.

A control head or control device 11 is mounted above the container 1 and is suitably affixed thereto. Within the control device 11, a channel or flow duct 9 is aligned in communication with the flow duct 6 and another channel or flow duct 10 is aligned in communication with the liquid supply pipe 8. Another channel or flow duct 12 in the control device 11 extends parallel to the channel 9 and communicates with an outlet opening 12a in the top of the container 1. As a result, the channel 12 is in communication through the opening 12a with that space in the supply container above the level of the lubricating liquid therein.

An enlarged central bore 13 extends completely through the control head 11 in alignment and in communication with the flow line 7, but, as illustrated, the diameter of the bore 13 is significantly larger than the diameter of the flow line 7. An inwardly directed shoulder 14 is formed adjacent the bottom of the bore 13 and the top surface of this shoulder 14 has a generally frusto-conical configuration to enable it to serve as a valve seat. Screw threads 15 are provided at the upper end of the bore 13 to enable suitable control valve means to be threaded thereinto.

The control valve means is generally designated 16 and is in the form of an adjustable spindle or elongated valve stem which projects into and is threaded within the bore 13. The spindle or elongated valve stem includes a head part 17 projecting above the control device 11, such head part carrying an operating handle 18 and an indicating pointer 19 which can cooperate with a scale provided on the top surface of the control device 11.

The adjusting spindle or valve means 16 includes a pair of spaced apart annular grooves 20 and 21. After the spindle has been suitably threaded into the bore 13, the annular groove 20 is in alignment with a transverse flow duct or flow channel 22 which connects with the flow channel 9. Similarly, the annular groove 21 is in alignment with a transverse flow duct or flow channel 23 which connects with the channel 12. The lower end of the elongated valve stem or spindle is provided with a downwardly and inwardly tapering conical portion 24 which forms a control cone which cooperates with the shoulder 14. That is, the shoulder 14 and control cone 24 serve as a liquid flow control valve means for purposes to be described hereinafter. A transverse flow duct or flow channel 25 extends between the flow channel 10 and the central bore 13, just above the shoulder or valve seat 14. As a result, the valving action caused by adjustment of the control cone 24 with respect to the shoulder 14 serves to adjust or vary the liquid flow from the supply pipe 8 to the flow line 7, such liquid flow occurring through the channels 10 and 25 and through the central bore 13 past the valve means 14, 24.

A blind-end bore 26 extends at least partially through the elongated valve stem, commencing at its head portion 17 and terminating substantially at the level of the annular groove 21. A flow regulating valve or closing spindle generally designated 27 is mounted within the valve means 16. This valve 27 includes an enlarged digitally engageable head 28 and an elongated stem extending therefrom, such stem carrying threads 29 which engage with compatible threads along a portion of the blind end bore 26. At the end of the stem there is provided a conical end portion 30 which cooperates with an inwardly directed shoulder 31 along the blind end bore 26, the shoulder 31 serving as a valve seat which cooperates with the conical portion 30 which acts as the valve. The shoulder 31 is positioned between the annular grooves 20 and 21 so that the valve means thus controls flow from one annular groove to the other. A bore 32 extends through the wall of the adjustable spindle 16 to thus place the annular groove 20 in flow communication with the internal blind bore 26. A similar bore 33 serves the same function for placing the annular groove 21 in communication with the internal blind bore 26. Suitable sealing gaskets 34 are housed in grooves provided in spaced relation along the walls of the bore 13 to prevent any leakage of the air passing through the annular grooves 20 or 21. Similar suitable flow gaskets, not illustrated, can also be provided along the stem of the closing spindle 27.

To consider the operation of the first embodiment of invention, as illustrated in FIG. 1, the spindle head 28 is manually operated to adjust the valving position of the air flow control valve, 30, 31. Similarly, the handle 18 is manually moved to adjust the valving position of the liquid flow control valve 14, 24. The compressed air flow pipe 2 is connected with the supply of compressed air and with the tool operated by the compressed air thus causing compressed air to flow through the pipe 2 in the direction from sleeve 3 toward sleeve 4. As such compressed air flows through the pipe 2, a dynamic air pressure develops on the upstream side of the throttling means 5, causing a portion of the air to be diverted through the upstream flow line 6 and into the control device 11. Once in the control device 11, this diverted air passes through the channel 9, through the channel 22 and into the annular groove 20, through the bore 32, past the valve 30, 31, through the lower portion of the blind end bore 26, out through the bore 33 and the annular groove 21 and through the channels 23 and 12 to exit through the outlet opening 12a in the top of the container. As this air thus exits through the opening 12a it applies a pressure to the surface of the lubricating liquid therein and since the container is closed, this pressure applied against the lubricating liquid causes a portion of such liquid to be forced upwardly through the liquid supply pipe 8 and into the control device 11. As the liquid passes from the pipe 8 into the control device 11, it flows through the channels or ducts 10 and 25 and into the central bore 13, past the liquid flow control valve 14, 24 and back through the downstream flow line 7 and into the compressed air pipe 2 on the downstream side of the throttling means 5. As such liquid flows from the lower mouth of the flow line 7 and into the pipe 2, it is admixed with the air travelling through the pipe 2 and is effectively atomized. It then continues in this form through the remainder of the pipe 2 and into the tool which is connected at 4 with the compressed air pipe.

It will be understood that the adjustment of the valve means 14, 24 controls the quantity of lubricating liquid which is supplied, while adjustment of the valve means 30, 31 controls the air flow and hence the pressure which is applied to the lubricating liquid. Either or both of these valves can be closed, as desired, to prevent any lubricating operation from occurring. As an alternative construction, not illustrated herein, the closing spindle 27 can be eliminated and a spring-biased ball valve can be used, with the pressure of the spring being suitably adjustable as, for instance, by means of a screw engageable from outside the control device 11.

Figure 3:
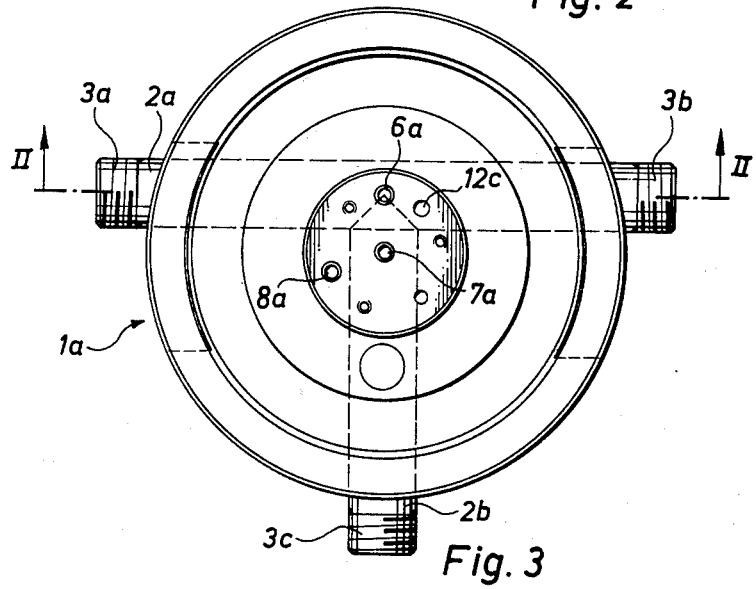
FIG. 3 is a top plan view of the second embodiment with the control device removed therefrom.

Referring now to the second embodiment of the invention, the container is designated 1a and the compressed air pipe extends therethrough. The compressed air pipe of this second embodiment includes a straight portion 2a which extends completely through the container in a hermetically sealed fashion and which is provided with connecting ends 3a and 3b at opposite sides of the container. The pipe means also includes a branch line 2b connected perpendicularly and centrally to the straight portion 2a, such branch portion extending outwardly of the container as illustrated in FIG. 3 and having a connecting portion 3c at the end thereof. The connection 3c is the connection for the tool which is operated by the compressed air while the connections 3a and 3b are the connections for coupling the second embodiment to a source of compressed air. The arrows illustrated in FIG. 5 show the direction of air flow through the pipe of the second embodiment and end caps or covers 49 can be used, if desired, to close one end of the straight pipe portion 2a. The connecting portions 3a, 3b and 3c can be threaded to facilitate connection.

The throttling means of the second embodiment is provided by an aperture 5a at the point where the branch line 2b meets with the straight line 2a. The diameter of this throttling hole 5a is significantly less than the diameter of the pipe portions 2a and 2b.

As best illustrated in FIG. 4, a pair of pipes or flow lines 6a and 7a extend between the compressed air flow pipes and a connecting plate 41 which is used for attachment to the control device or control head 11a. The flow line 6a constitutes the upstream flow line and connects with the straight pipe portion 2a. The pipe or flow line 7a constitutes the downstream flow line and connects with the branch portion 2b on the downstream side of the throttling means. As is best illustrated in FIG. 4, the lower end or terminal portion of the downstream flow line 7a projects into the interior of the branch portion 2b and such terminal portion is beveled to form a slanted surface which is directed away from the throttling means 5a. That is, the terminal portion of the pipe 7a closest to the throttling means projects further into the compressed air pipe 2b than does the side directed away from the throttling means 5a. The connecting plate 41 is provided with screw threads 42 which are used to connect the same to the control head 11a and, if desired, a sealing plate can be interposed therebetween.

Figure 2:
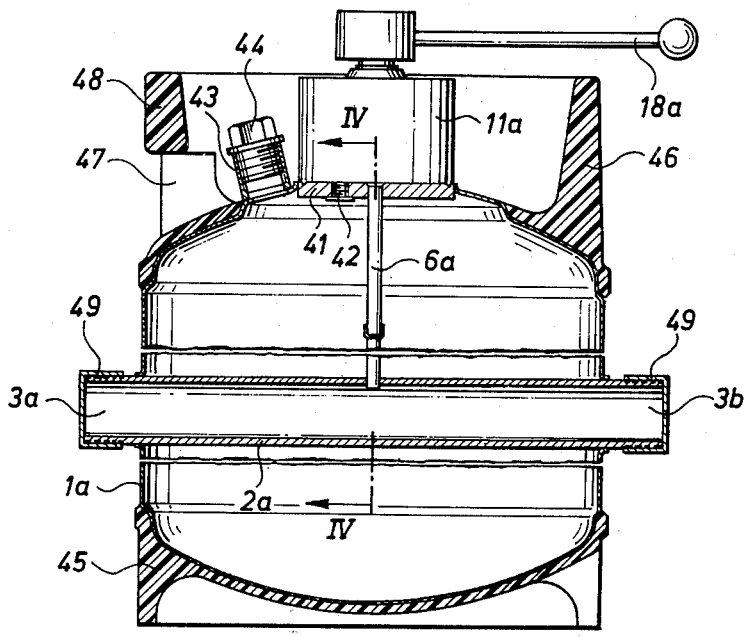
FIG. 2 is a sectional view taken along the line II—II of FIG. 3, illustrating a sectional view through a second embodiment of the invention.

As can be seen from FIG. 2, the container 1a of the second embodiment is of the domed or vaulted variety and it includes a filler spout 43 and a cap or closing plug 44 therefor. A plastic base portion 45 can be attached to the bottom of the container 1a for the purpose of supporting the same and a plastic protective jacket 46 can be connected to the top of the container 1a. The height of the jacket 46 is substantially the height of the control device 11a and thus serves to protect the same. A recess 47 can be formed in the protective jacket 46 to form a holding handle 48 for the purpose of conveying the container.

The control head or control device 11a includes an internal channel 9a which extends in flow communication with the upstream flow line 6a. It also includes a flow channel or duct 10a which extends in flow communication with the fluid supply pipe or eduction tube 8a. As illustrated in FIGS. 4 and 5, the liquid supply pipe 8a is arranged to extend outside the branch line 2b and to a level beneath it and adjacent the bottom of the container, thus assuring that the open end of the pipe 8a will be beneath the level of the lubricating liquid in the container 1a. A transverse channel 25a serves to connect the channel 10a with an enlarged central bore 13a. As illustrated in FIGS. 6 and 8, a narrow frustoconical shoulder 13b is provided at the base of the bore 13a to serve as a valve seat and this shoulder 13b merges into a bore or channel 13a which communicates with the downstream flow line 7a.

The channel 9a which connects with the upstream flow line 6a likewise connects with a transversely extending channel or flow duct 22a which merges into a downwardly directed channel 12b which exits at an outlet opening 12c in the connecting plate 41. As a result, air flow from the upstream side or the straight pipe portion 2a passes through the upstream flow line 6a, through the channel 9a, through the transverse channel 22a, through the channel 12b and exhausts through the outlet opening 12c to apply pressure against the liquid in the container 1a.

An excess pressure valve is provided in the control head 11a as illustrated in FIG. 6. This excess pressure valve includes a ball 51 mounted on an inwardly directed shoulder or seat disposed along a bore 50. A biasing spring 52 serves to normally hold the ball 51 closed against its seat and a hollow screw 53 threaded in from the top of the control head 11a serves to adjust the biasing pressure of the spring 52. The bore 50 communicates with a mating bore 60 in the connecting plate 41, as illustrated in FIG. 5.

The valve means of the second embodiment is likewise illustrated in FIG. 6. This valve means includes a control spindle 16a which is threaded at 15a into the bore 13a in the control head. A control cone 24a is provided at the bottom of the spindle to cooperate with the valve seat 13b, thereby providing the liquid flow control valve. A sealing gasket 34a is provided between the spindle 16a and the walls of the bore 13a to prevent liquid leakage. A seal 55 is provided between a cylindrical outer part 54 of the adjusting spindle 16a with such seal being interposed between the portion 54 and the corresponding recess in the top of the control head 11a. A holding nut 56 is screwed on to the head portion 17a of the adjusting spindle 16a and is secured thereto by means of a cross pin 57. The holding nut 56 is surrounded by a ring 58 into which an operating handle 18a is inserted. The holding nut 56 is connected by means of a spiral spring 59 with a ring 58 mounted thereupon, thus making possible a resilient adjustment of the spindle 16a.

The operation of the second embodiment is substantially similar to that described for the first embodiment, although the second embodiment has the ability to permit a double connection, at 3a and 3b, with the source of compressed air, thus making sure that a large flow of compressed air passes through the pipe 2a. As previously indicated, the compressed air passing through the upstream side or the pipe 2a has a portion thereof diverted through the upstream flow line 6a. This diverted portion flows through the ducts or channels 9a, 22a and 12b and exhausts through the outlet opening 12c to apply pressure to the liquid in the container 1a. The adjustable valve means 50, 51 and 52 serves to control the amount of pressure which can be applied against the lubricating liquid and this pressure is readily adjustable by a simple adjustment of the screw 53. When the pressure exceeds the predetermined amount, the valve 51 opens until a sufficient amount of the pressure has been relieved. The pressure on the liquid in the container 1a causes such liquid to rise through the supply pipe 8a and to pass through the internal channels or ducts 10a and 25a and the bore 13a, past the liquid flow control valve 24a, 13b and to then pass through the bore 13a and the downstream flow line 7a where it enters the branch flow line 2b to admix with the compressed air flowing therethrough. This mixture of air and atomized lubricating liquid is then supplied to the tool which is connected with the second embodiment at 3c.

Various changes and modifications of a minor nature, such as those which would be apparent to one of ordinary skill in the art, can be made in the embodiments herein described without departing from the spirit and scope of the appended claims.

What is claimed is:

1. Apparatus for controlling lubrication of a compressed air tool by controlled continuous introduction of lubricating liquid into the supply of compressed air for said tool, said apparatus comprising:
   a supply container for said lubricating liquid;
   an air flow pipe extending through said supply container and adapted for connection at a first location with a supply of compressed air and at a second location with said tool;
   flow throttling means disposed in said air flow pipe, with that portion of said pipe between said first location and said throttling means constituting the upstream side of said pipe and that portion of said pipe between said throttling means and said second location constituting the downstream side of said pipe;
   a control device attached to said supply container;
   a liquid supply tube disposed in said supply container and extending between said control device and the lubricating liquid in said supply container;
   an upstream flow line disposed in said supply container and connected between the upstream side of said flow pipe and said control device;
   said control device having flow channel means therein connecting said upstream flow line with an outlet opening communicating with said supply container whereby a portion of the compressed air passing through said air flow pipe flows through said upstream flow line, said flow channel means and said outlet opening to apply pressure to the surface of the lubricating liquid in said supply container;
   said control device further including adjustable air flow control valve means for controlling said pressure applied to the surface of the lubricating liquid;
   a downstream flow line disposed in said supply container and connected between the downstream side of said flow pipe and said control device;
   said control device having flow duct means therein connecting said downstream flow line with said liquid supply tube;
   said control device further including adjustable liquid flow control valve means through which said flow duct means pass, with said liquid flow control valve means controlling the amount of liquid which can pass from said liquid supply tube to said downstream flow line;
   said pressure applied to the surface of said lubricating liquid causing a portion of said liquid to flow through said liquid supply tube, past said liquid flow control valve means, through said downstream flow line and into the downstream side of said air flow pipe where it is introduced into the compressed air flowing therethrough and is hence conveyed to said second location.

2. Apparatus as defined in claim 1 wherein said liquid flow control valve means includes an elongated valve stem having a control cone at the end thereof and further includes a valve seat in said control device with which said control cone cooperates.

3. Apparatus as defined in claim 2 wherein said air flow control valve means comprises a flow regulating valve disposed within said elongated valve stem, said flow regulating valve including a regulating valve seat within said stem and an adjustable spindle having a conical end which cooperates with said regulating valve seat.

4. Apparatus as defined in claim 3 wherein said elongated valve stem includes a pair of spaced annular grooves and wherein said flow channel means includes:
   a first channel means connected between said upstream flow line and one of said annular grooves,
   a second channel means connected between said outlet opening and the other of said annular grooves, and
   internal flow passage means in said elongated valve stem connecting said annular grooves in flow communication with one another;
   said regulating valve seat being disposed in said internal flow passage means whereby said adjustable spindle can be moved to vary the position of said conical end with respect to said valve seat to thus regulate the amount of air passing from said first channel means to said second channel means.

5. Apparatus as defined in claim 1 wherein said air flow pipe is a straight pipe and wherein said throttling means is a venturi disposed therein.

6. Apparatus as defined in claim 1 wherein said air flow pipe includes a straight portion and a perpendicularly extending branch portion and wherein said throttling means comprises an aperture which provides flow communication between said straight portion and said branch portion, said straight portion thus constituting said upstream side and said branch portion thus constituting said downstream side.

7. Apparatus as defined in claim 6 wherein said downstream flow line has a terminal portion projecting into said branch portion adjacent said aperture, said terminal portion being beveled to form a slanted surface, said slanted surface being directed away from said aperture.

8. Apparatus as defined in claim 1 wherein said air flow control valve means comprises a flow bore connected between the interior of said supply container and the atmosphere, and a spring-biased ball valve in said flow bore, said ball valve normally being biased closed to prevent communication with the atmosphere but being openable against the biasing force of said spring when the pressure against said lubricating liquid exceeds a predetermined magnitude.

* * * * *